Oct. 26, 1954    L. T. JONES    2,692,782
REINFORCED FLEXIBLE EXPANSION JOINT FOR PIPE LINES
Filed Oct. 3, 1950

INVENTOR.
Lawrence T. Jones
BY
Fraser, Myers & Manley
ATTORNEYS.

Patented Oct. 26, 1954

2,692,782

UNITED STATES PATENT OFFICE 2,692,782

REINFORCED FLEXIBLE EXPANSION JOINT
FOR PIPE LINES

Lawrence T. Jones, Palmyra, N. Y., assignor to
The Garlock Packing Company, Palmyra, N. Y.,
a corporation of New York Application October 3, 1950, Serial No. 188,152

2 Claims. (Cl. 285—90)

This invention relates to flexible expansion joints such as are commonly used in pipe lines to compensate for expansion and contraction therein and to absorb vibration which is harmful to machines connected with such piping. More particularly, it relates to expansion joints which are molded of reinforced flexible rubber or other suitable rubber-like material (hereinafter referred to for convenience merely as "rubber") and having end flanges, for use in connecting the joint between two lengths of pipe or between a pipe and a machine, and a central arch portion which is more or less U-shaped in axial cross-section and is adapted to facilitate axial expansion and contraction.

Such a joint, even though commonly reinforced by the use of plural layers of stout fabric embedded in the rubber, nevertheless tends to become distended radially as a result of the pressure carried in the pipe line and in the expansion joint. To oppose such distention, it has become common practice to embed a plurality of endless metal rings in the walls of the joint between the flanges and the central arch portion. However, when such reinforcing rings are used, the tendency toward distention which is present in the arch imposes an outwardly directed force upon the reinforcing rings at each side of the arch tending to push the reinforcing rings axially outwardly toward the end flanges. This force is quite strong and at relatively high pressures causes the mentioned reinforcing rings to burrow through the rubber to some extent in an axial direction, thus rupturing the rubber and seriously damaging the joint.

An important object of the present invention is the provision of a rubber expansion joint including metal reinforcing rings in which means are employed for preventing such axial burrowing of the reinforcing rings.

The foregoing and other objects are accomplished by the present invention of which a single embodiment is shown in the accompanying drawing for illustrative purposes without, however, limiting the invention to the particular illustrated embodiment.

Figure 1:
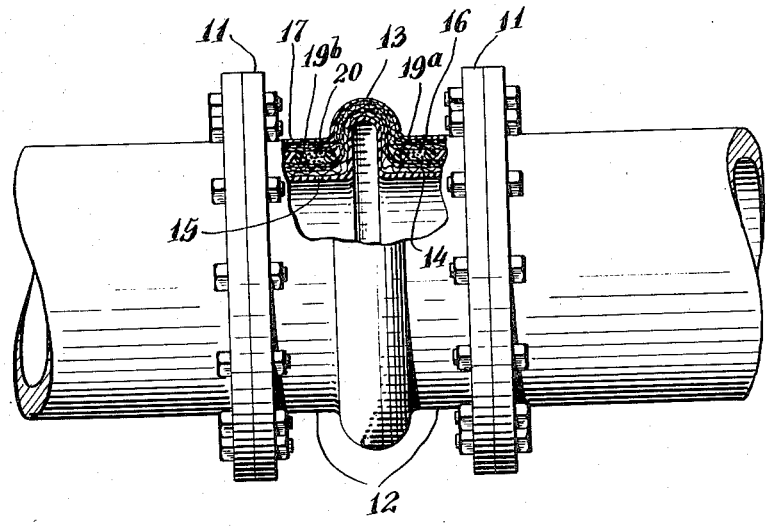
Figure 2:
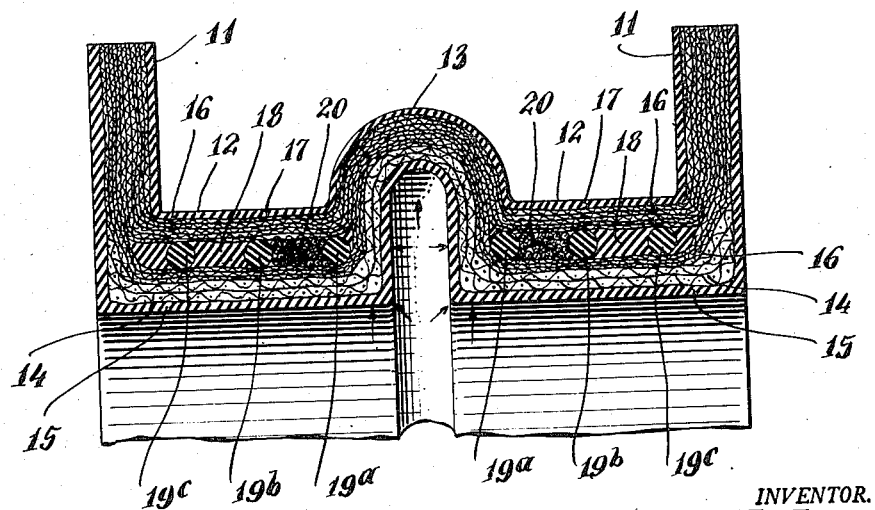

In the drawing, Figure 1 is a side elevational view of a rubber expansion joint according to the present invention shown in association with fragmentary ends of two pipes which are interconnected by said joint, the joint being partly broken away to show it in axial section, and Fig. 2 is an enlarged view including the axial sectional portion of the expansion joint shown in Fig. 1.

An expansion joint according to the embodiment of this invention illustrated in the drawings comprises opposite end flanges 11, a pair of cylindrical walls 12 adjoining the end flanges, and an annular expansion arch 13 which is U-shaped in axial section and adjoins and interconnects the two walls 12. The parts thus far detailed are molded of relatively soft flexible rubber, reinforced by the embedding therewithin of plural layers of fabric.

It may be advantageous to provide two different types of fabric reinforcement as for example, several plies of relatively heavy but coarsely woven fabric which, as shown at 14, may immediately surround an inner layer 15 of rubber, and plural plies of rather tightly woven fabric which, as shown at 16, may be disposed between the coarse fabric plies 14 and an outer rubber wall 17. These several plies of fabric, as shown in the drawings, preferably extend throughout the entire length of the joint. Within the cylindrical walls 12, however, the plies 16 may be separated by a solid annular body of rubber 18 within which are disposed plural endless metal reinforcing rings 19a, 19b and 19c, which may preferably be of steel or other metal of sufficient tensile strength to enable them to prevent radial distention of the cylindrical walls 12.

When the joint is in use and under considerable internal fluid pressure that pressure is exerted in the directions indicated by the several arrows within and at the inner edges of the arch 13 as shown in Fig. 2. This application of pressure tends not only to distend the arch radially but also tends to spread the arch axially with the result that the reinforcing rings 19a at each side of the arch receive a strong wedging force tending to urge them axially outwardly toward the reinforcing rings 19b. In expansion joints heretofore developed there was nothing but the body of rubber 18 to oppose such axially outward movement of the rings 19a with the result that, under relatively high pressure within the joint, the rings 19a would burrow their way axially through the rubber 18 until they reached a position adjacent to or in contact with the rings 19b. This, of course, ruptured the joint structure and caused it to break down and require replacement after a relatively short useful life.

According to the present invention, means for preventing such axially outward shifting of the rings 19a are provided in the form of filler or abutment means embedded in the rubber between the rings 19a and 19b. Although the mentioned means, within this invention, may take several different forms, nevertheless it has been found that such means may advantageously comprise a winding of plural turns of metal wire 20 which, during the assembly of the various constituents of the joint preliminary to its molding, may be so wound that the turns of the wire 20 may substantially fill the more or less cylindrical annular spaces between the rings 19a and 19b in each of the walls 12. In other words, the wire 20 preferably is in axial alignment with the two rings 19a and 19b and the complete windings of the wire 20 are of approximately the same diameter as the said reinforcing rings.

In an expansion joint as hereinbefore described the metal wire 20 acts as a barrier which prevents the reinforcing rings 19a from shifting axially outwardly within the rubber 18, thereby preventing rupturing of the joint even through very substantial pressure is present therewithin. By thus holding the rings 19a in place, reinforcing rings 19a, b, c, are enabled to function throughout a long useful life of the joint to prevent material radial distention of the walls 12 while nevertheless permitting free axial movement of the latter relatively to each other to compensate for expansion and contraction which may occur in the pipe line in which the joint is used. Because of the fact that several turns of the wire 20, considered collectively as a single abutment, contact and abut the rings 19a throughout a radial dimension corresponding to the cross sectional diameter of said rings, it follows that the wire not only opposes the mentioned axially outward shifting of the rings 19a but also opposes any tendency of said rings to shift bodily relatively to each other and to the axis of the joint. In other words, the wire 20 also functions to maintain the rings 19a and 19b in axial alignment and thus avoid undesirable distortion of the joint which would result from any shifting of said rings into axially non-aligned positions.

It will readily be understood by those familiar with this art that various barrier means may be employed other than the plural turns of metal wire 20 and that the present invention, also, may be utilized in flexible joint structures other than hereinbefore described without however departing from the inventive concept as set forth in the following claims.

What I claim is:

1. A flexible expansion joint comprising a flexible annular, central portion which may expand and contract axially and which tends to become distended radially in the presence of fluid pressure therewithin, cylindrical walls adjoining said central portion at opposite ends thereof, plural similar, endless, reinforcing rings, of material of relatively high tensile strength, embedded coaxially within said walls in axially spaced inter-relationship, and annular barrier means, substantially non-compressible axially, embedded within said walls and disposed coaxially to and between the two of said rings in each wall which are nearest to said flexible portion, for opposing outward axial shifting of the ring in each wall which is nearest to said flexible portion; the said barrier means comprising a winding of wire between said two rings in each wall, said winding of wire extending throughout a radial dimension corresponding substantially to the radial dimensions of said rings and being in intimate association with the latter over surface areas of substantial extent at opposed sides thereof.

2. A flexible expansion joint comprising a U-shaped, flexible, annular, central portion which may expand and contract axially and which tends to become distended radially in the presence of fluid pressure therewithin, cylindrical walls adjoining said central portion at opposite ends thereof, plural, similar, endless, reinforcing rings of material of relatively high tensile strength, embedded coaxially within said walls in axially spaced inter-relationship, and annular barrier means comprising a winding of plural, intimately associated turns of wire embedded coaxially within said walls between the two of said rings in each wall which are nearest to said flexible portion for opposing outward axial shifting of the ring in each wall which is nearest to said flexible portion, the said winding of wire extending throughout a radial dimension corresponding substantially to the radial dimensions of said rings and being in intimate association with the latter over surface areas of substantial extent at opposite sides thereof.

References Cited in the file of this patent

UNITED STATES PATENTS

| Number | Name | Date |
|---|---|---|
| 1,052,106 | Voorhees | Feb. 4, 1913 |
| 1,696,435 | Fraley | May 8, 1923 |
| 1,911,570 | Holstein | May 30, 1933 |